United States Patent [19]

Bowers

[11] 3,907,475
[45] Sept. 23, 1975

[54] APPARATUS FOR BLOW MOLDING CONTAINERS

[75] Inventor: Kenneth E. Bowers, Prairie Village, Kans.

[73] Assignee: Ethyl Development Corporation, Kansas City, Mo.

[22] Filed: Aug. 20, 1973

[21] Appl. No.: 389,695

Related U.S. Application Data

[62] Division of Ser. No. 209,167, Dec. 17, 1971, Pat. No. 3,796,531.

[52] U.S. Cl. . 425/302 B; 425/304 B; 425/DIG. 204
[51] Int. Cl.² ............................................. B29C 24/00
[58] Field of Search ... 425/DIG. 204, 326 B, 387 B, 425/302 B; 83/914

[56] References Cited
UNITED STATES PATENTS

| | | | |
|---|---|---|---|
| 3,224,038 | 12/1965 | Budesheim | 425/DIG. 212 |
| 3,340,569 | 9/1967 | Hagen | 425/DIG. 204 |
| 3,466,702 | 9/1969 | Stenger | 425/DIG. 204 |
| 3,632,267 | 1/1972 | Kader | 425/242 B |
| 3,752,621 | 8/1973 | Shelby | 425/DIG. 204 |

*Primary Examiner*—Francis S. Husar
*Assistant Examiner*—Robert J. Charvat
*Attorney, Agent, or Firm*—Donald L. Johnson; John F. Sieberth; E. Donald Mays

[57] ABSTRACT

A method and apparatus for blow molding hollow plastic containers which include a split mold having two mold halves. A blow pin support assembly is attached to one of the mold halves and extends therebelow. The blow pin assembly is mounted on the support means and is adjustable thereon to provide centering of the blow pin with the neck opening provided in one end of the blow mold. The support structure includes means for vertically and horizontally positioning the blow pin assembly to provide exact centering of the blow pin assembly with the neck opening in the mold.

8 Claims, 11 Drawing Figures

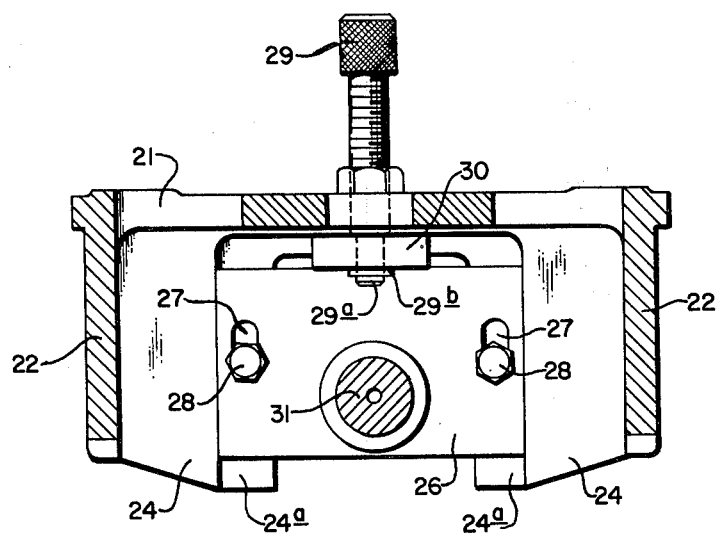
FIG. 3A.
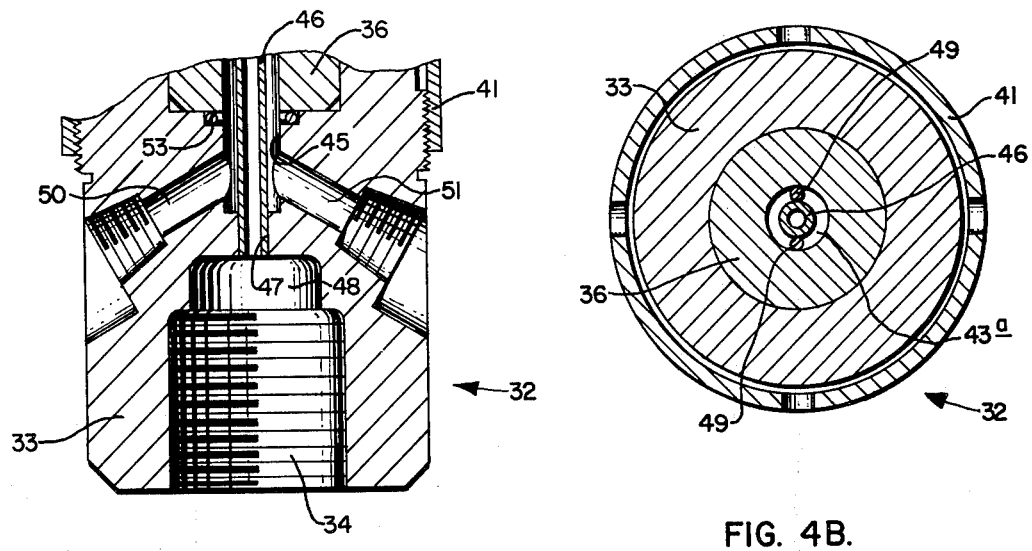
FIG. 6.
FIG. 4B.

APPARATUS FOR BLOW MOLDING CONTAINERS

This is a division of application Ser. No. 209,167, filed Dec. 17, 1971, now U.S. Pat. No. 3,796,531.

BACKGROUND OF THE INVENTION

1. Field of the Invention

This invention relates to a method and apparatus for blow molding plastic containers using a split blow mold wherein the blow pin assembly is mounted below and attached to one of the mold halves.

2. Description of the Prior Art

In the art of blow molding hollow plastic containers from preformed thermoplastic parisons using a split mold having two matching mold halves, blow pin assemblies for so-called "bottom blowing" have, in most instances, been mounted beneath the mold halves and permanently affixed to the support structure of the blow molding machine. When the blow pin assembly is attached to the blow molding apparatus below the mold halves, considerable adjustment and alignment must be carried out in order to insure exact centering of the blow pin with the axial opening provided in the lower face of the mold which forms the neck of the plastic container. Each time the molds in a blow molding machine are replaced, it is necessary to make an adjustment of the blow pin assembly in order to compensate for the change in location of the neck opening of the new blow mold in order to provide exact centering of the blow pin assembly within the neck opening.

In U.S. Pat. No. 3,351,980, the blow pin assembly is mounted on one or both of the mold platens and is adapted to be centered and aligned by means of a plurality of arms which are pivotably connected to the mold support assemblies and to the blow pin assembly. The device is carried on a pair of pins which are anchored on one of the blow mold support extension means and provides for automatic adjustment of the blow pin through the mold halves in the horizontal plane. However, adjustment in the vertical plane is limited and requires manual resetting. Additionally, the device might be subject to mechanical misalignment because of the complicated suspension mechanism utilizing a multiplicity of suspending arms.

The present apparatus overcomes many of the difficulties encountered in the apparatuses used heretofore for mounting blow pin assemblies beneath split blow mold halves and also provides for ready adjustment of the blow pin assemblies for centering with the axial opening provided in the molds when switching from one size mold to another.

Additionally, the blow molding apparatus of the present invention provides an improved, novel blow pin assembly which is equipped with interchangeable tip portions, whereby different neck configurations may be produced on bottles without the necessity of completely changing the entire blow pin assembly.

SUMMARY OF THE INVENTION

It is an object of the present invention to provide a method and apparatus for blow molding plastic containers which permit a blow pin assembly to be exactly centered with the neck opening in the mold.

It is another object of the present invention to provide a method and apparatus for blow molding plastic containers which provide a novel blow pin assembly.

It is still another object of the present invention to provide a method and apparatus for blow molding plastic containers which provide an adjustable support assembly for positioning the blow pin beneath the mold halves.

It is also an object of the present invention to provide a method and apparatus for blow molding plastic containers which include a support assembly for adjusting the blow pin in both the horizontal and vertical planes.

The foregoing objects and other advantages that are brought out hereinafter are realized in the apparatus aspects of the present invention in an apparatus for blow molding hollow containers from a thermoplastic parison which includes a split mold comprising two mold halves, the mold providing a cavity to receive the parison and an axial neck opening in its bottom surface. Means to open and close the mold halves are provided. A support structure is attached to only one of the mold halves and extends downwardly therefrom. The blow pin assembly is movably mounted on the support structure for vertical and horizontal adjustment and has its outer end in axial alignment with the neck opening of the mold. Power means are coupled to the lower end of the blow pin and are adapted to move the outer end of the blow pin into and out of the neck opening.

Another aspect of the present invention is realized in a blow pin assembly for use in a blow molding apparatus which includes a body member having an axial recess at one end thereof. A blow tip has one end received in the axial recess. Means to couple the blow tip to the body member are provided.

The present invention provides a novel arrangement for mounting a blow pin assembly beneath a pair of split mold halves, whereby the blow pin assembly can be adjusted both vertically and horizontally. A support assembly is attached to one of the mold halves and is coupled to the means used to move that mold half, whereby the entire blow pin assembly and support means move in the horizontal plane with the mold halves. The mounting assembly provides easy adjustment, whereby the vertical and horizontal position of the blow pin may be readily changed to adapt the machine for blowing different-sized containers. The device provides a rugged and simple mounting assembly which accurately and readily positions the blow pin for proper entry into the neck opening in the split blow mold.

BRIEF DESCRIPTION OF THE DRAWING

FIG. 3A is a cross-sectional view of FIG. 3 taken along line 3A—3A;

FIG. 4B is a cross-sectional view of FIG. 4 taken along line 4B—4B;

FIG. 6 is a vertical, sectional view of the lower portion of FIG. 5 taken in the plane of the drawing;

DESCRIPTION OF THE PREFERRED EMBODIMENTS

Figure 2:
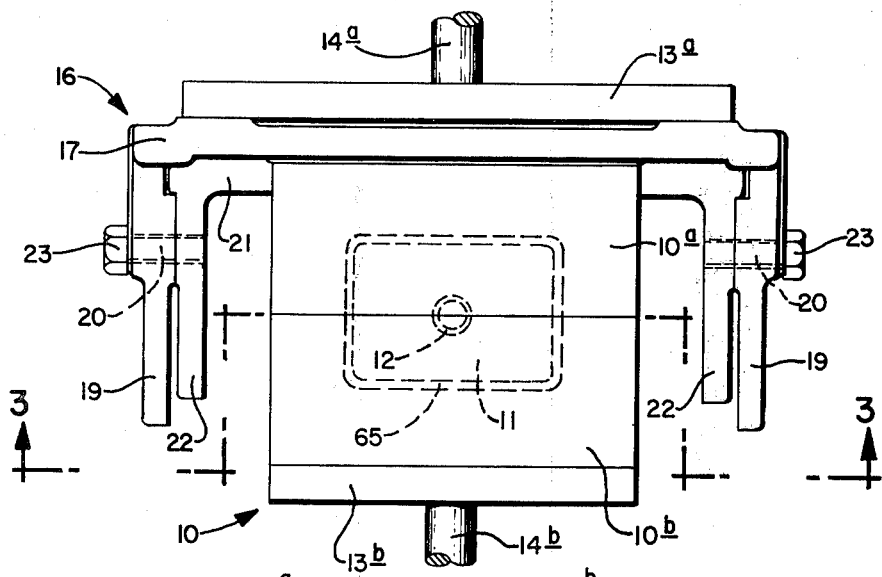
FIG. 2 is a top plan view of FIG. 1.

Referring now to FIGS. 1, 2, 3 and 3A, the blow molding apparatus of the present invention includes a split mold, designated generally by the numeral 10, which includes a left mold half 10a and a right mold half 10b. The mold is provided with a cavity 11 having the shape of the hollow article to be formed. An axially aligned neck opening 12 is provided in the lower face of the mold 10. The left mold half 10a is mounted on left platen 13a by means of bolts (not shown) or other suitable means. The left platen is, in turn, supported and mounted for horizontal movement on push rod 14a which is, in turn, connected to power means (not shown), such as a pneumatic cylinder for actuation of mold half 10a. Right mold half 10b is connected by volts (not shown) or other suitable means to right platen 13b which is, in turn, connected to right push rod 14b which is, in turn, connected to power means (not shown) for horizontally moving the left platen and attached mold half into and out of engagement with the right mold half. A blow assembly, designated generally 15, is mounted below the split mold 10 by means of a support structure, designated generally 16. The support structure 16 includes a first, inverted, generally U-shaped bracket 17 having its upper end attached to the platen 13a by means of bolts 18. The first bracket 17 includes a pair of opposed side plates 19—19 which may be integrally formed therewith. The side plates 19—19 are provided with opposed, vertically extending, elongated slots 20—20. A second U-shaped bracket 21 carries the blow assembly 15. The second bracket 21 is provided with a pair of opposed side plates 22—22 which make sliding engagement with the side plates 19—19 of the first U-shaped bracket and are attached thereto by means of bolts 23—23 received in slots 20—20.

The second U-shaped bracket is provided with a pair of transversely extending, spaced apart, bottom plates 24—24 on its lower end, as may be seen in FIG. 3A. The pneumatic cylinder portion 25 of the blow assembly is provided with a transversely extending collar plate 26 which is supported by the inner edges 24a—24a of the top surface of the spaced apart bottom plates 24—24 (see FIG. 3A). Collar plate 26 is provided with a pair of spaced apart, elongated slots 27—27 which slidably receive bolts 28—28 to attach and lock the blow assembly 15 to the support frame 16. The slots 27—27 permit transverse or horizontal adjustment of the blow assembly to permit alignment of the blow assembly with the neck opening 12 and the blow mold 10. The horizontal positioning of the blow assembly 15 in relation to the frame 16 is determined by the setting of hand screw 29 which has its inner end 29a locked to an upturned ear 30 by means of a lock ring 29b. Ear 30 may be an integral part of the top plate 26 of the pressure cylinder assembly 25, or may be attached thereto by welding or other suitable means.

Figure 3:
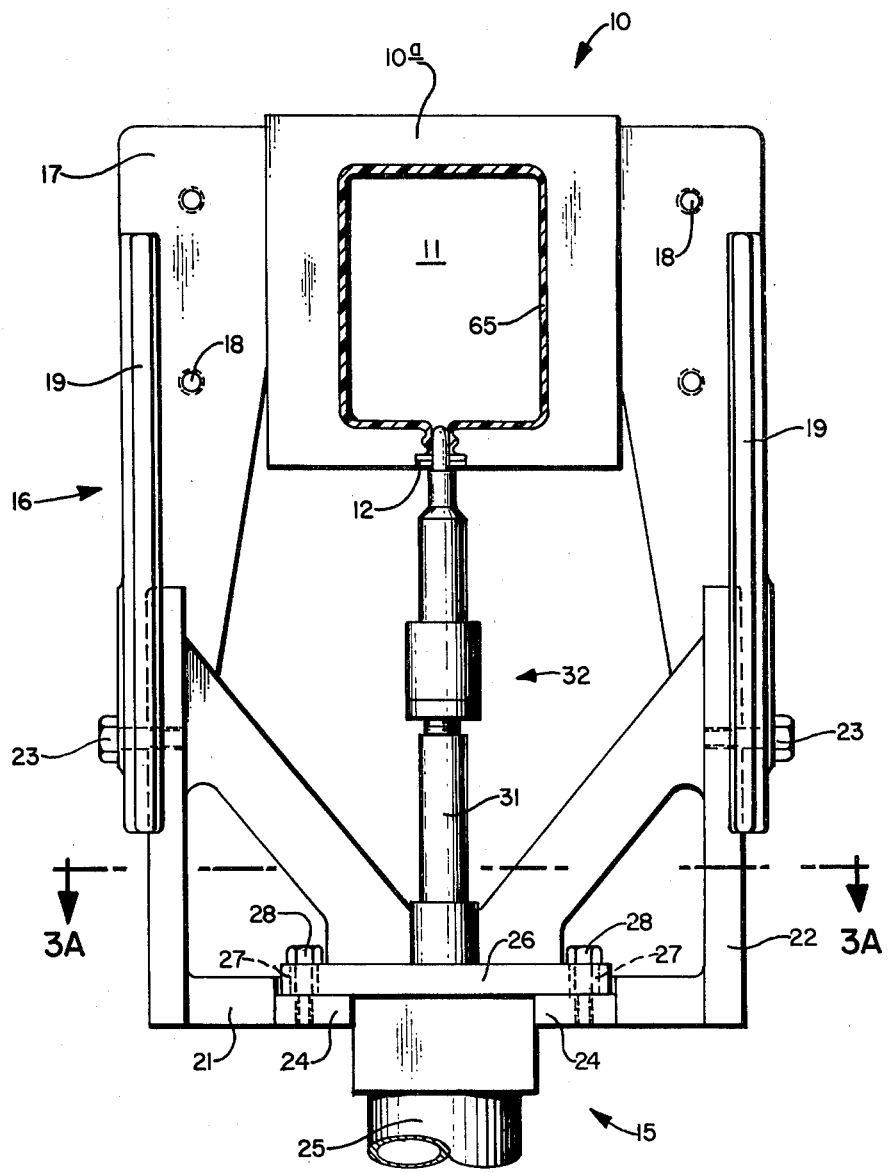
FIG. 3 is a view of FIG. 2 taken along line 3—3.

The blow assembly 15 includes the pneumatic cylinder portion 25 which is provided with a piston (not shown) within the cylinder which is attached to a piston rod 31, the upper end of which extends through collar plate 26. The upper end of piston rod 31 is threaded, as seen in FIG. 3, and has attached thereto the blow pin assembly, designated generally by the numeral 32.

Figure 4:
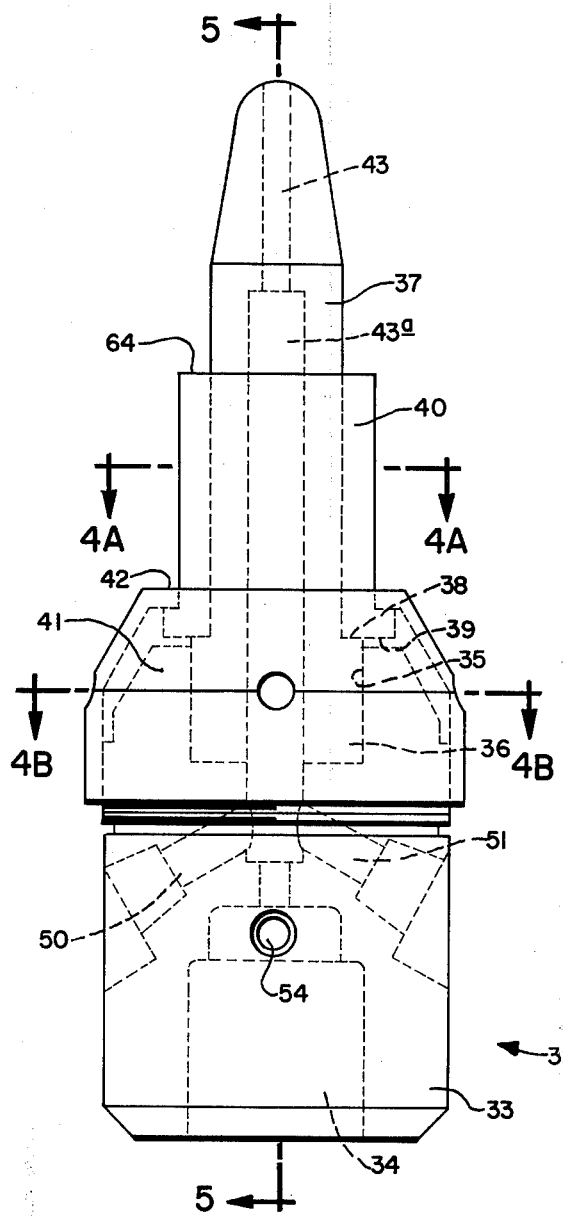
FIG. 4 is an enlarged, elevational view of a blow pin assembly constructed in accordance with the present invention.
Figure 5:
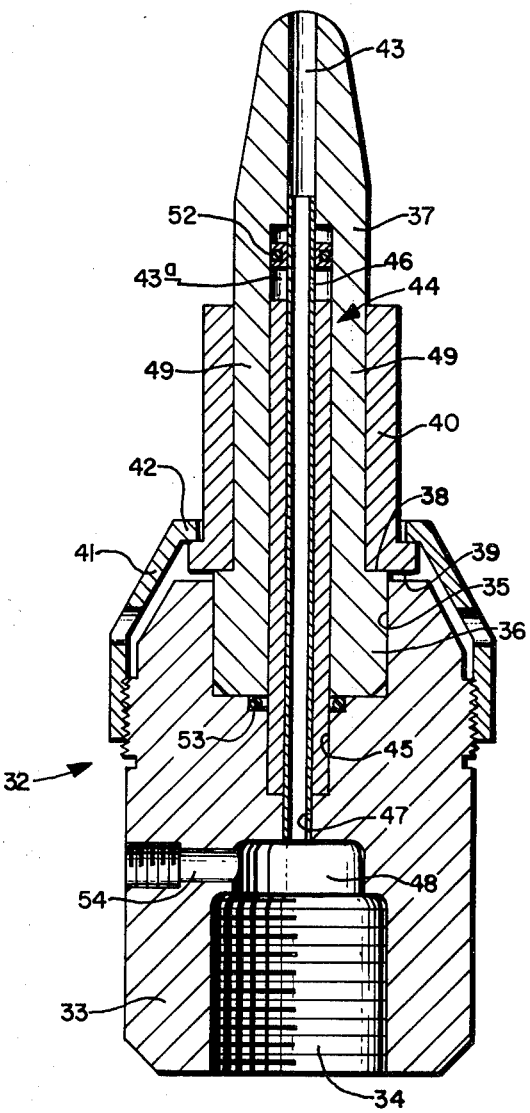
FIG. 5 is an elevational, sectional view of FIG. 4 taken along line 5—5.
Figure 4A:
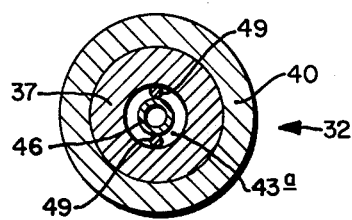
FIG. 4A is a cross-sectional view of FIG. 4 taken along line 4A—4A.

Referring now to FIGS. 4-6, the blow pin assembly 32 includes a generally cylindrical body member 33 having an axial, threaded recess 34 provided in the bottom end thereof which receives the threaded end 31 of the piston rod to attach the blow pin assembly thereto. The top or upper end of body 33 is provided with an axial recess 35 which receives the lower end 36 of blow tip 37. Lower end 36 of the blow tip is provided with an upwardly facing shoulder 38 which abuts the outturned flanged end 39 of cylindrical cutter sleeve 40 which is slidably received over the intermediate portion of blow tip 37. The blow tip 37 and cutter sleeve 40 are attached to the body 33 by means of collar 41 which is threadably attached at its lower end to the body member 33 and has its upper end 42 in abutment with the flanged end 39 of the cutter sleeve. Blow tip 37 is provided with an axial bore 43 therethrough to provide for the passage of blow air into the parison to produce the hollow article 65. The bore 43 is provided with an enlarged portion 43a which receives a liquid coolant distribution tube assembly, designated generally by the numeral 44. The lower end of the coolant distribution tube assembly 44 is received in an axial recess 45 provided in the bottom of bore 36 of the body. The coolant distribution tube assembly 44 includes a blow air conduit tube 46 having its upper end received within the small-diameter portion of the axial bore 43 in the upper end of the blow tip. The lower end of the conduit tube 46 passes through a bore 47 which communicates with the bore 45 and blow air introduction recess 48 which is adjacent and communicates with the bore 34 in the lower end of the body. As seen in FIGS. 4A, 4B and 5, the portion of the conduit 46 received in the enlarged bore 43a is provided with spaced apart, vertically extending vane members 49—49 which may be affixed to the exterior surface of the tube 46 by means of silver soldering or other suitable means. Cooling water inlet bore 50 is provided in the body member 33 and communicates with the area of the bore 43a on one side of the vanes 49—49 to circulate cooling water up through half the bore 43a and down through the other half of the bore. Cooling water exit bore 51 is provided in the body member 33 on the same plane as the inlet bore and provides a means for returning the cooling water to the supply source. O ring 52 in the upper end of the blow tip 37 provides a seal between the coolant distribution tube assembly 44 and the blow tip 37 to prevent leakage of cooling fluid into the blow air bore 43. A second O ring 53 is provided at the lower end of the coolant tube assembly 44 and makes a seal between the lower face of the blow tip 37 and the body member 33. Transverse bore 54 is provided in the side of body 33 and communicates with blow air inlet recess 48 to supply blow air from an outside source to the blow pin assembly.

Figure 1:
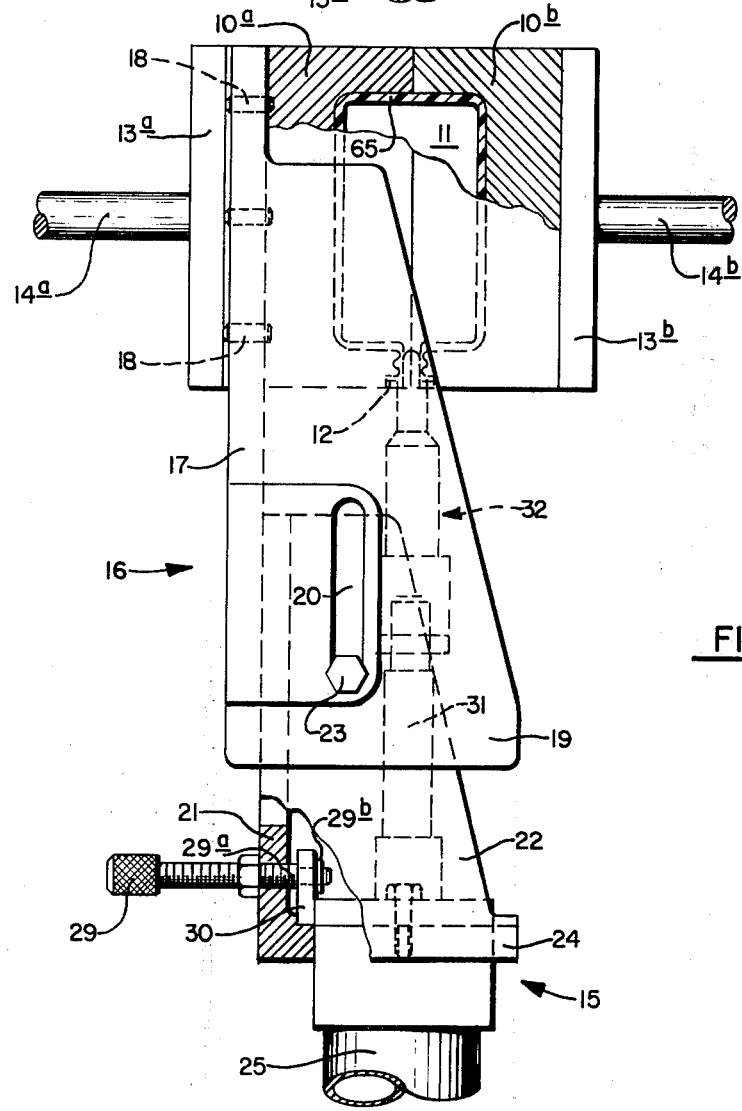
FIG. 1 is an elevational, side, partially broken view of a blow molding apparatus utilizing the present invention.
Figure 7:
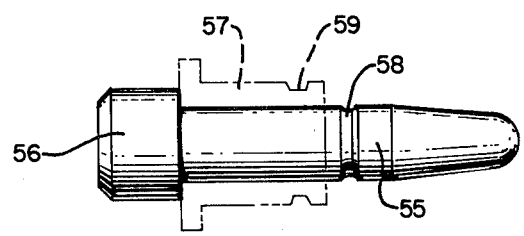
FIG. 7 is a side, elevational view of one embodiment for the replaceable blow tip of the blow pin assembly.

Referring to FIG. 7, an alternate embodiment for the blow pin tip and cutter sleeve is shown. Blow pin tip 55 is provided with an enlarged base portion 56 against which is seated the cutter sleeve 57. The wall of the blow tip is provided with an annular groove 58 immediately above the upper end of the cutter sleeve. The cutter sleeve is provided with an annular groove 59 adjacent its upper end. As shown in FIG. 1, the blow tip 55 enters the end of the plastic parison from which the hollow article is formed. The softened plastic flows into the groove 58 and provides an integral annular ring on the inner wall of the neck of the plastic container. The groove 59 on the cutter sleeve engages the soft plastic moil or neck waste which is cut from the plastic parison by the cutter sleeve 57 engaging an anvil surface (not shown) on the mold surrounding the neck opening 12. The plastic received in groove 59 cools and is, thus, firmly seated in the groove. This insures that the moil or waste portion will be affixed to the cutter sleeve 57 when the blow pin is retracted from the neck of the blown hollow article. Minor adjustment of the height of the blow pin assembly 32 can be made by rotating the blow pin assembly on the threaded end of the piston rod 31 to insure that the cutting edge 64 of the cutter sleeve makes the proper contact with the anvil surface on the mold.

Figure 8:
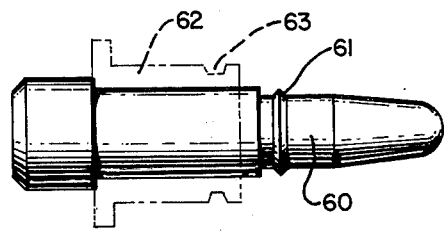
FIG. 8 is a side, elevational view of another embodiment for the replaceable blow tip of the blow pin assembly.

Referring now to FIG. 8, still another embodiment for the blow pin and cutter sleeve is shown wherein the blow pin 60 is provided with a raised annular ring 61 adjacent the end of the cutter sleeve 62. The cutter sleeve 62 is also provided with an annular groove 63 which serves the same purpose described above for the groove 59 in the embodiment shown in FIG. 7. Ring 61 produces a groove in the inside wall of the neck of the container.

In operation, the blow molding apparatus of the present invention is supplied with a thermoplastic parison (not shown) from a conventional parison extruder (not shown) which is received between the open halves of the split mold 10. The mold closes around the parison, the neck portion of the parison extends through the neck opening 12, and the tail of the parison is gripped by suitable gripping surfaces on the matching faces of the mold halves 10a and 10b. Power is supplied to the hydraulic cylinder assembly 25 raising piston rod 31 and inserting the tip 37 of the blow pin assembly 32 into the open end of the parison which extends through the neck opening 12 of the blow mold 10. The cutting edge 64 of the cutter sleeve 40 engages a hardened anvil surface (not shown) carried by the mold halves 10a and 10b adjacent the neck opening 12 to thereby sever the moil or waste portion of the neck of the container from the formed container. Blow air is supplied through inlet 54 and through the coolant distributor tube assembly 44 and exits through the tip bore 43 in the blow pin assembly into the hollow of the mold 11. The blow air expands the hollow parison to conform to the wall shape defined by the cavity 11 in the blow mold 10 to produce the finished bottle 65. Cooling fluid, e.g., water, is continuously circulated through the passages of the blow tip assembly 32 as described hereinbefore. After the hollow article 65 has cooled sufficiently, the blow pin assembly 32 is withdrawn by reversing the power to hydraulic cylinder 25, and the mold halves 10a and 10b are opened to remove the bottle 65.

While there has been described what is considered preferred embodiments of the present invention, it will be understood that modifications may be made therein by those skilled in the art without departing from the essence of the invention, and, thus, the invention is to be limited only by the scope of the following claims.

What is claimed is:

1. A blow pin assembly for use in a blow molding apparatus, said assembly comprising:
    a. a body member having an axial bore extending at least part way through said body and an axial counterbore at one end of said body;
    b. a separate blow tip having an axial bore therethrough communicating with said bore in said body member;
    c. a separate generally cylindrical cutter ring slidably receivable over said blow tip and seated on its base and on an annular shoulder provided on said base of said blow tip; and
    d. a collar member having one end removably connected to said body member and its other end coupled to said cutter ring whereby said blow tip is fixedly seated to said body.

2. The blow pin assembly of claim 1 wherein means are provided in said body member and said blow tip for circulating a cooling fluid therethrough.

3. The blow pin assembly of claim 1 wherein said body member is provided with a radial bore communicating with said axial bore for supplying blow air to the blow mold apparatus.

4. The blow pin assembly of claim 1 wherein said cutter ring is provided with an annular, outwardly projecting shoulder at its base end which is in abutment with said other end of said collar.

5. The blow pin assembly of claim 4 wherein both said cylindrical ring and said blow tip are provided with adjacent annular grooves in their outer walls.

6. The blow pin assembly of claim 4 wherein the outer wall of said cylindrical ring is provided with an annular groove adjacent its outer end and the outer wall of said blow tip is provided with a raised annular ring adjacent said annular groove in said cylindrical ring.

7. The blow pin assembly of claim 1 wherein a portion of said axial bore of said blow tip has an enlarged diameter and said means for circulating a cooling fluid includes a coolant distribution tube assembly received in enlarged diameter, adjacent portions of said bores in said body member and said blow tip, a coolant entrance bore and a coolant exit bore in said body member, each of said bores communicating with said enlarged diameter, adjacent portions of said bores in said body member and said blow tip.

8. The blow pin assembly of claim 1 including an axial recess provided in said body member opposite said axial counterbore.

* * * * *